Sept. 20, 1932.  C. F. SCHNUCK ET AL  1,878,716
REPETITIVE PROCESS INDICATOR APPARATUS
Filed May 2, 1930  3 Sheets-Sheet 1

INVENTORS:
Carl Frederic Schnuck
BY Gregory W. Kuntney
ATTORNEY

INVENTORS:
Carl Frederic Schnuck
BY Gregory W. Kuntney
ATTORNEY

Patented Sept. 20, 1932

1,878,716

UNITED STATES PATENT OFFICE

CARL FREDERIC SCHNUCK, OF NEW HAVEN, AND GREGORY W. KUNTNEY, OF NAUGATUCK, CONNECTICUT, ASSIGNORS OF ONE-HALF TO FARREL-BURMINGHAM COMPANY, INC., OF DERBY, CONNECTICUT, A CORPORATION OF CONNECTICUT, AND ONE-HALF TO THE BRISTOL COMPANY, OF WATERBURY CONNECTICUT, A CORPORATION OF CONNECTICUT

REPETITIVE-PROCESS INDICATOR APPARATUS

Application filed May 2, 1930. Serial No. 449,340.

The invention relates to a signal and indicator device, more especially as associated with timing mechanism adapted to note predetermined timed intervals at which certain operations are to be performed.

It has for its object to provide means of indicating and signaling to an operator, either visually or audibly, or both, the time of initiation and completion of various stages of a repetitive operation, thus insuring the uniformity of procedure necessary, as in the compounding of stock, etc. For example, in the use of the novel apparatus definite instructions may be given an operator, and his attention called thereto, as in performing a mixing procedure in which there is involved the addition, at different stages, of various ingredients to a batch or stock under treatment. The invention has for a further object the provision of a chart member or timing dial of substantial size upon which may be displayed suitable instructions to the operator relative to the various operations to be performed, the legends embodying said instructions being associated with the particular time intervals; and there is designed, also, to move over said chart a uniformly driven and timed pointer element to coact with the same.

A further object of the invention resides in the provision of means for enabling adjustment in the times of operation of the signal elements; and the arrangement is such, moreover, that a close grouping of these is possible, if desired.

In carrying out the invention, a removable timing dial or chart member is arranged to have uniformly rotated thereover a pointer element, as by means of a suitably timed member such as a clock or synchronous motor; and the said chart is sub-divided or graduated, for example about its circumference, to correspond to the desired operations to be performed, sufficient space being provided thereon to admit of also including on said chart the required instructions to an operator.

There is also rotatable with said pointer element a contact brush designed to engage contact elements corresponding to the subdivisions of the chart; and the contact elements are adjustable angularly and may be secured in different positions to accommodate the apparatus to different timings of the various operations to be performed. Suitable electrical signal apparatus, either visual or audible, or both, is arranged to be energized through contact members as the brush moves thereover.

The nature of the invention, however, will best be understood when described in connection with the accompanying drawings, in which.

Figure 1:
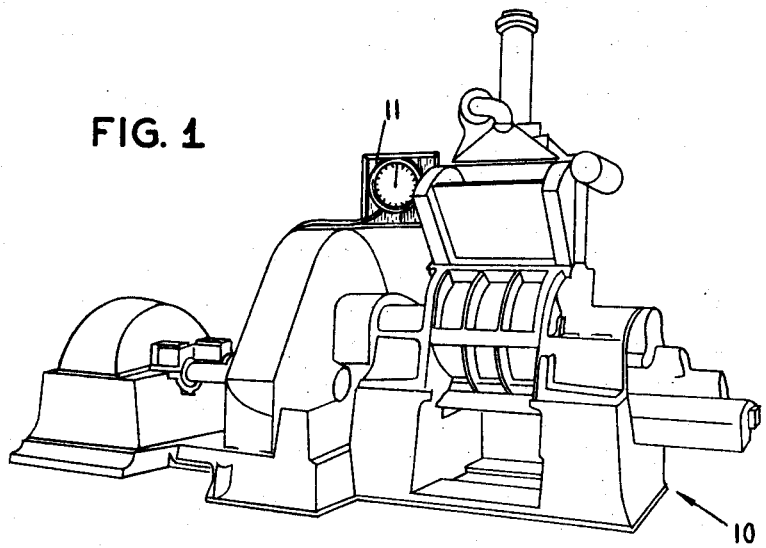
Fig. 1 is a view in perspective of a mixing machine with the novel time indicator apparatus installed thereon.

Referring to the drawings, 10 designates apparatus with which the novel indicator apparatus may be associated advantageously. For example, the apparatus 10 may constitute a mixer device wherein rubber or other stock is to be charged with certain compounds to be mixed therewith, the mixing being continued for a definite period of time, whereupon other ingredients are added at definite intervals during the mixing cycle. It will be understood that a considerable variation in the stock treated and the materials added may be encountered; and provision is made with the novel apparatus for accommodating these changes.

Figure 2:
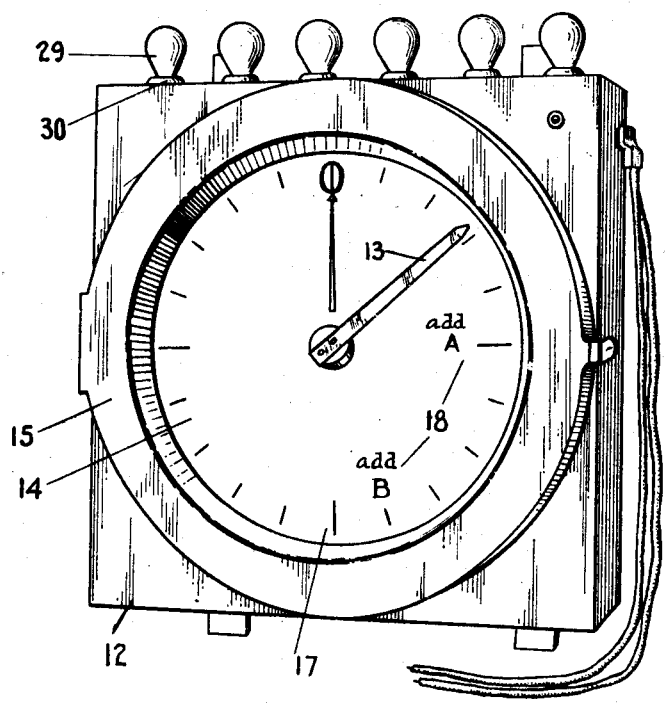
Fig. 2 is a view in perspective showing on an enlarged scale the novel process indicator apparatus.
Figure 3:
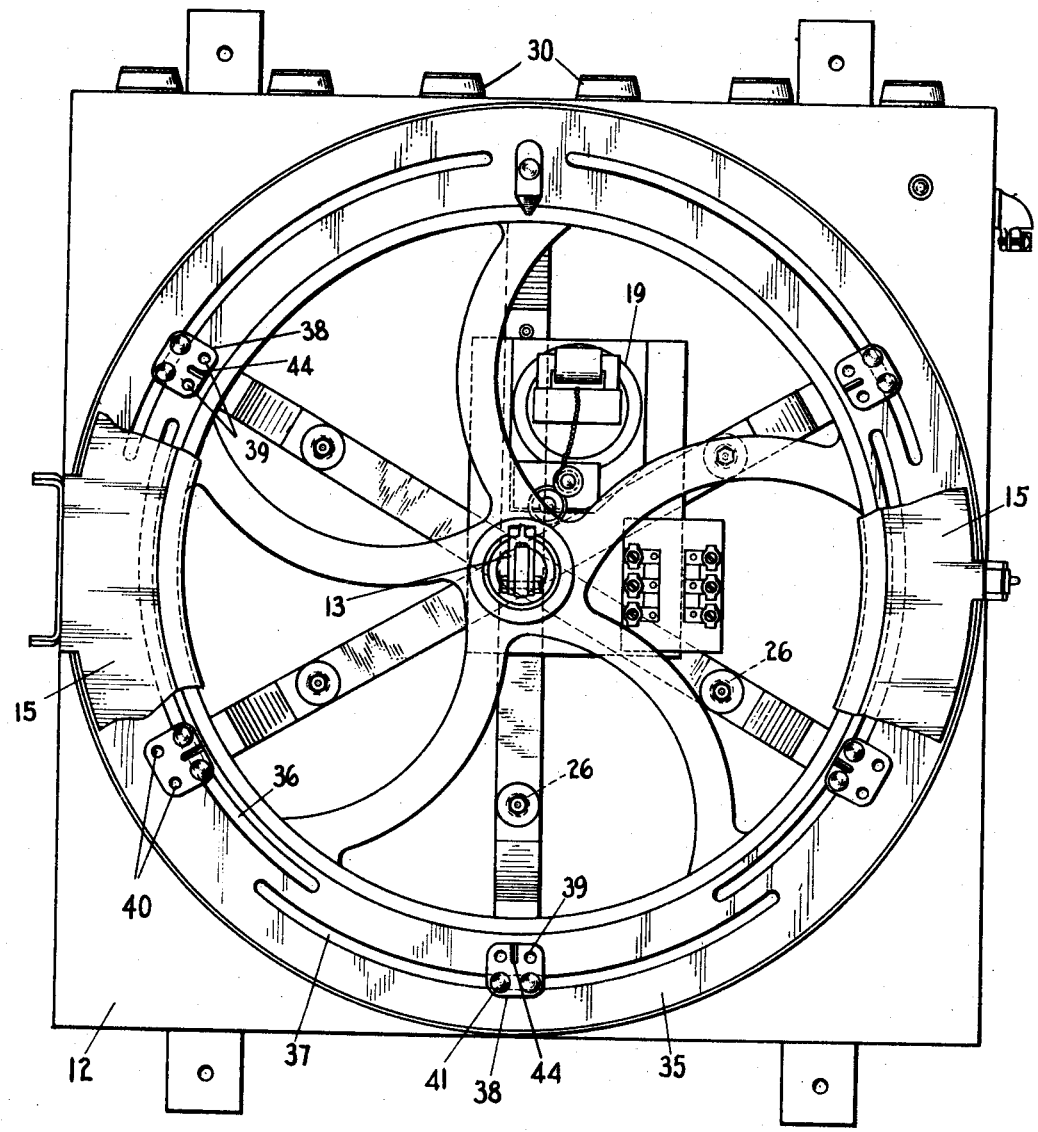
Fig. 3 is a front elevation, on an enlarged scale, of the interior of the indicator apparatus, the dial plate and casing being removed, with fragmentary view of the casing door shown.
Figure 4:
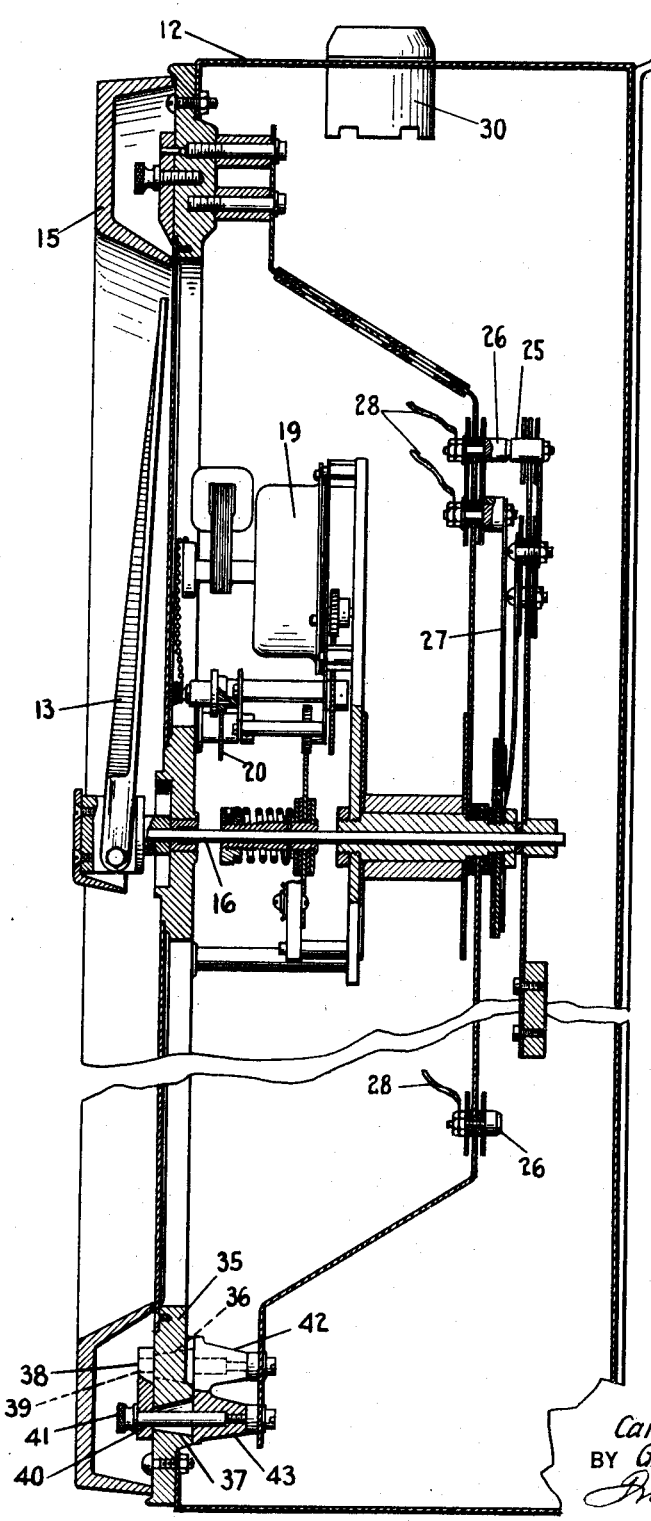
Fig. 4 is a transverse central section through the indicator apparatus.

The indicator apparatus is, for convenience, associated in proximity to the mixing apparatus 10, for example, on a board 11 which may be secured to the mixer apparatus; and as indicated more fully in Fig. 2 of the drawings, comprises a casing 12 for the mechanism hereinafter more fully described and which is designed to rotate at a uniform velocity a pointer member 13 over a dial or chart 14 of ample proportions. A cover member 15 is hinged to the casing 12 to protect said dial and may be locked to the casing, if desired, to prevent tampering therewith.

The dial itself is arranged to be removably mounted over a driving arbor 16 and the pointer element 13 is to this end hingedly connected to its arbor to admit of placing the chart in position without requiring the same to be split, said pointer being frictionally held to the arbor so that it readily may be re-set to zero either forwardly or backwardly—all of which is well understood and forms no particular part of the present invention. The chart, moreover, is sub-divided along its circumference as by means of the graduations 17 and various legends 18, as indicated, may be associated therewith upon the face of the chart for calling attention to the necessary operations to be performed at the particular time when the pointer reaches such graduation.

Rotation may be imparted to the pointer arbor 16 in any convenient or desired manner, for example by means of a clock mechanism, or preferably, by means of a synchronous electrical motor 19; and an intermediate speed changing gearing 20 may be provided so that the arbor may be driven at different speeds as in certain instances it is desirable to speed up operations.

The arbor 16 carries also a contact-making brush 25 which is rotatable therewith angularly and is designed to contact successively with various contact elements 26 arranged circularly upon and adjustable about the arbor 16, but the same are not rotatable therewith. These contact elements are normally held in fixed position, as hereinafter set forth, and are adjustable angularly to correspond to different graduations of the chart. An electrical conductor 27 is taken from the brush element and conductors 28 from the different contact elements to electrically responsive means, such as audible or visual signal devices, for example, the lamps 29 mounted in sockets 30 at the top of the casing. Thereby, as contact is effected between the brush and a particular contact element the corresponding lamp of the group of lamps 29 will be illuminated in the usual manner and give indication that some particular operation is to be performed, the operation being noted simultaneously on the dial by the pointer, which rotates in synchronism with said brush, registering the position of the same on the dial.

As stated hereinbefore, the respective contact elements are angularly adjustable so that the interval for different operations may be varied to suit the conditions, it being understood that the graduations of the dial are then also modified so that when a particular signal is flashed, the pointer will indicate the corresponding operation to be performed together with the necessary instructions. So long as the same process is to be repeated, no further change need be made and uniformity in both treatment and product is attained.

To admit conveniently of this adjustment of the contact elements as well as to secure the same in position, a circular locking plate 35 is mounted beneath the dial and the same is provided with successive arcuate slots 36 and 37, alternate ones being displaced radially and the successive slots overlapping circularly. Over the slots are designed to slide blocks 38 having two pairs of openings 39 and 40 designed to register respectively with the different sets of arcuately disposed slots.

A pair of locking studs 41, also, is provided for each contact element; and the same pass through the one pair of openings of a sliding block, and through the corresponding arcuate slot into one pair of two sets or pairs of threaded sockets 42 and 43 of the juxtaposed contact elements, the inner ends of the said studs being threaded to lock therein and clamp a block and thereby the contact element to the circular holding plate.

It will be appreciated that in this position, a block cannot be swung further than the limit of the corresponding slot; but if it be desired to move a contact element beyond the same, a block with attached contact element is swung to the limit of a slot, one of the pair of studs clamped, and the other removed and transferred to one of the openings of the other pair of openings of a block. This stud is then locked in one of the further pairs of corresponding sockets, while the other stud may then be removed from the first-named pair of openings and transferred to the other pair, as before.

By loosening the stud first placed therein, the contact element may then be adjusted in the new slot and secured in the desired position therein. Thus a contact element may be moved over the entire dial to any desired position.

There is provided, moreover, on the top surface of a block a suitable mark or indication 44, radially disposed thereon and designed to register, when the cover member 15 is open, with the various time graduations of the dial in accordance with the adjustment of a said contact element.

We claim:

1. In a device of the character set forth: a dial provided with time graduations, a rotatable contact-making brush, a pointer member movable therewith angularly over the said dial, timed means for effecting the rotation of said brush and pointer member, and a plurality of contact bearing elements each angularly adjustable over the entire dial for contact with the said brush and carrying indicia adapted for registry with the time graduations of the dial.

2. In a device of the character set forth:

a dial provided with time graduations, a rotatable contact-making brush, a pointer member movable therewith angularly over the said dial, timed means for effecting the rotation of said brush and pointer member, a circular locking plate having arcuate overlapping slots therein, contact bearing elements having extensions slidable in said slots for adjustment of the said contact elements with respect to said dial and carrying indicia adapted for registry with the time graduations thereof, and means to secure an extension to said locking plate in either of the overlapping slot positions.

3. In a device of the character set forth: a dial provided with time graduations, a rotatable contact-making brush, a pointer member movable therewith angularly over the said dial, timed means for effecting the rotation of said brush and pointer member, a circular locking plate having arcuate slots disposed angularly therein and alternate slots having different radii and overlapping one another, contact bearing elements having extensions slidable in said slots for adjustment of the said contact elements with respect to said dial and carrying indicia adapted for registry with the time graduations thereof, and means to secure a contact extension in either of said slots.

4. In a device of the character set forth: a dial provided with time graduations, a rotatable contact-making brush, a pointer member movable therewith angularly over the said dial, timed means for effecting the rotation of said brush and pointer member, a circular locking plate having arcuate slots disposed angularly therein and alternate slots having different radii and overlapping one another, sliding blocks carrying indicia adapted for registration with the time graduations of the dial, contact bearing elements movable with the blocks and said blocks having pairs of openings adapted to register with the respective radially disposed arcuate slots, and a pair of studs adapted to pass through the corresponding block openings and corresponding arcuate slot and having a threaded end to fit a corresponding pair of two pairs of registering threaded sockets in a contact bearing element.

In testimony whereof we affix our signatures.

CARL FREDERIC SCHNUCK.
GREGORY W. KUNTNEY.